(12) United States Patent
Bell

(10) Patent No.: US 11,458,849 B2
(45) Date of Patent: Oct. 4, 2022

(54) CHARGING INPUT SELECTOR SYSTEMS FOR ELECTRIFIED VEHICLES

(71) Applicant: FORD GLOBAL TECHNOLOGIES, LLC, Dearborn, MI (US)

(72) Inventor: Christopher W. Bell, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 135 days.

(21) Appl. No.: 16/826,876

(22) Filed: Mar. 23, 2020

(65) Prior Publication Data

US 2021/0291674 A1    Sep. 23, 2021

(51) Int. Cl.
| | |
|---|---|
| *H02J 7/00* | (2006.01) |
| *H02J 7/14* | (2006.01) |
| *B60L 53/16* | (2019.01) |
| *B60L 53/18* | (2019.01) |
| *B60L 50/60* | (2019.01) |
| *B60L 53/12* | (2019.01) |

(52) U.S. Cl.
CPC ............... *B60L 53/16* (2019.02); *B60L 50/66* (2019.02); *B60L 53/12* (2019.02); *B60L 53/18* (2019.02); *H02J 7/0045* (2013.01)

(58) Field of Classification Search
CPC .......... B60L 53/16; B60L 53/12; B60L 53/18; B60L 50/66; H02J 7/0045
USPC ....................................................... 320/109
See application file for complete search history.

(56) References Cited

U.S. PATENT DOCUMENTS

| | | | | |
|---|---|---|---|---|
| 5,654,621 | A * | 8/1997 | Seelig | H02J 7/025 320/108 |
| 9,878,628 | B2 * | 1/2018 | Tsukamoto | B60L 53/305 |
| 10,442,301 | B2 * | 10/2019 | Gerber | H02J 7/0027 |
| 10,637,258 | B2 * | 4/2020 | Ando | B60L 53/18 |
| 2008/0185197 | A1 * | 8/2008 | Nakamura | B60K 6/445 180/65.28 |
| 2009/0102433 | A1 * | 4/2009 | Kamaga | B60L 53/22 320/165 |
| 2009/0192655 | A1 * | 7/2009 | Ichikawa | B60L 53/20 700/291 |

(Continued)

FOREIGN PATENT DOCUMENTS

| | | |
|---|---|---|
| CN | 204633433 U | 9/2015 |
| DE | 102019004206 A1 | 1/2020 |
| KR | 101998201 B1 | 7/2019 |

*Primary Examiner* — Alexis B Pacheco
(74) *Attorney, Agent, or Firm* — David B. Kelley; Carlson, Gaskey & Olds, P.C.

(57) ABSTRACT

This disclosure describes charging input selector systems for electrified vehicle charging systems. An exemplary charging input selector system may include one or more selector units movable between a first position that is displaced from an on-board charger unit and a second position that is in contact with the on-board charger unit. When the selector unit and the on-board charger unit contact one another, an on-board charger module electrically connected to the on-board charger unit may receive power from a charging input for charging a battery pack. When the selector unit and the on-board charger unit do not contact one another, the on-board charger module cannot receive power from the charging input. The selector unit may be passively moved between the first and second positions using the insertion force of a connector of an electric vehicle supply equipment (EVSE) assembly.

18 Claims, 4 Drawing Sheets

(56) References Cited

U.S. PATENT DOCUMENTS

| | | | |
|---|---|---|---|
| 2011/0121779 A1* | 5/2011 | Ichikawa | B60L 50/61 320/109 |
| 2013/0300364 A1* | 11/2013 | Baier | B60L 53/00 320/109 |
| 2017/0129357 A1* | 5/2017 | Zheng | B60L 53/11 |

* cited by examiner

CHARGING INPUT SELECTOR SYSTEMS FOR ELECTRIFIED VEHICLES

TECHNICAL FIELD

This disclosure relates to electrified vehicles, and more particularly to electrified vehicle charging input selector systems for passively selecting between two or more charging inputs for charging the vehicle.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A charging system connects an electrified vehicle to an external power source, such as a wall outlet or a charging station, for charging the energy storage devices (e.g., battery cells) of the electrified vehicle traction battery pack. Many charging systems utilize electric vehicle supply equipment (EVSE) for transferring electric power from the external power source to the vehicle for charging the battery pack through a connector that plugs into a charge port of a vehicle inlet assembly. The vehicle user is typically limited to a single charging input for charging the battery pack.

SUMMARY

A charging system for an electrified vehicle according to an exemplary aspect of the present disclosure includes, among other things, a vehicle inlet assembly, a charging input selector system housed within the vehicle inlet assembly and including a first selector unit movable between a first position that is displaced from an on-board charger unit and a second position that is in contact with the on-board charger unit, and an on-board charger module electrically connected to the on-board charger unit.

In a further non-limiting embodiment of the foregoing charging system, a battery pack is configured to receive power from the on-board charger module.

In a further non-limiting embodiment of either of the foregoing charging systems, the charging input selector system includes a second selector unit that is movable between a first position that contacts the on-board charger unit and a second position that is displaced from the on-board charger unit.

In a further non-limiting embodiment of any of the foregoing charging systems, a first charging input supplies power to the on-board charger module when the first selector unit is in contact with the on-board charger unit and a second charging input supplies power to the on-board charger module when the second selector unit is in contact with the on-board charger unit.

In a further non-limiting embodiment of any of the foregoing charging systems, the first charging input is provided by a connector of an electric vehicle supply equipment (EVSE) assembly and the second charging input is provided by a hands-free conductive charger or a wireless inductive charger.

In a further non-limiting embodiment of any of the foregoing charging systems, the second selector unit is biased toward the first position by a spring.

In a further non-limiting embodiment of any of the foregoing charging systems, the spring extends between the second selector unit and an internal surface of a housing of the vehicle inlet assembly.

In a further non-limiting embodiment of any of the foregoing charging systems, in the second position, an electrical contact of the first selector unit is in direct contact with a corresponding electrical contact of the on-board charger unit.

In a further non-limiting embodiment of any of the foregoing charging systems, the first selector unit and the on-board charger unit each include a disk-shaped body and a plurality of electrical contacts mounted to the disk-shaped body.

In a further non-limiting embodiment of any of the foregoing charging systems, the charging input selector system includes a second selector unit that is connected to the first selector unit by a spacer rod to establish a movable assembly.

In a further non-limiting embodiment of any of the foregoing charging systems, the movable assembly is movable to position the first selector unit in either the first position or the second position.

In a further non-limiting embodiment of any of the foregoing charging systems, the movably assembly is configured to position the first selector unit in the second position when a connector of an electric vehicle supply equipment (EVSE) assembly is inserted into the vehicle inlet assembly.

A method, according to another exemplary aspect of the present disclosure includes, among other things, during insertion of a connector of an electric vehicle supply equipment (EVSE) assembly into a vehicle inlet assembly of a charging system of an electrified vehicle, automatically switching between a first charging input and a second charging input associated with an on-board charger module of the charging system.

In a further non-limiting embodiment of the foregoing method, automatically switching between the first charging input and the second charging input includes moving a first selector unit of a charging input selector system from a first position that is displaced from an on-board charger unit and a second position that is in contact with the on-board charger unit. The on-board charger unit is electrically connected to the on-board charger module.

In a further non-limiting embodiment of either of the foregoing methods, the method includes biasing a second selector unit of the charging input selector system into contact with the on-board charger unit when the connector of the EVSE assembly is removed from the vehicle inlet assembly.

In a further non-limiting embodiment of any of the foregoing methods, the first charging input is provided by the EVSE assembly when the first selector unit is in the second position and the second charging input is provided by an alternative power source when the first selector unit is in the first position.

In a further non-limiting embodiment of any of the foregoing methods, the alternative power source is a hands-free conductive charger or a wireless inductive charger.

In a further non-limiting embodiment of any of the foregoing methods, the method includes charging an energy source of a battery pack of the electrified vehicle with power received from the charging input.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes charging input selector systems for electrified vehicle charging systems. An exemplary charging input selector system may include one or more selector units movable between a first position that is displaced from an on-board charger unit and a second position that is in contact with the on-board charger unit. When the selector unit and the on-board charger unit contact one another, an on-board charger module electrically connected to the on-board charger unit may receive power from a charging input for charging a battery pack. When the selector unit and the on-board charger unit do not contact one another, the on-board charger module cannot receive power from the charging input. The selector unit may be passively moved between the first and second positions using the insertion force of a connector of an electric vehicle supply equipment (EVSE) assembly. These and other features of this disclosure are discussed in greater detail in the following paragraphs of this detailed description.

Figure 1:
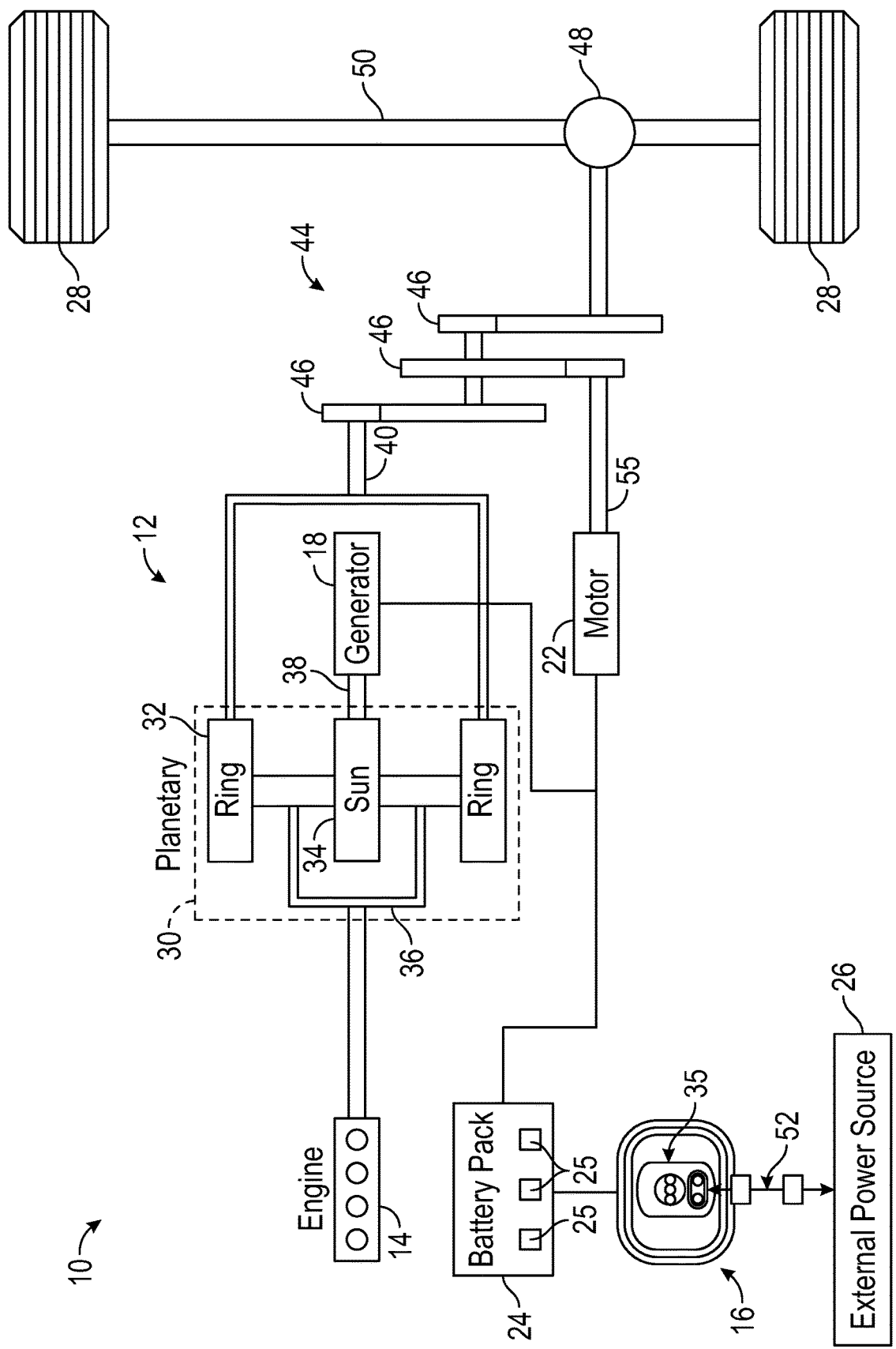
FIG. 1 schematically illustrates a powertrain of an electrified vehicle.

FIG. 1 schematically illustrates a powertrain 10 for an electrified vehicle 12. In an embodiment, the electrified vehicle 12 is a plug-in hybrid electric vehicle (PHEV). In another embodiment, the electrified vehicle is a battery electric vehicle (BEV).

In an embodiment, the powertrain 10 is a power-split powertrain system that employs a first drive system and a second drive system. The first drive system may include a combination of an engine 14 and a generator 18 (i.e., a first electric machine). The second drive system includes at least a motor 22 (i.e., a second electric machine) and a battery pack 24. In this example, the second drive system is considered an electric drive system of the powertrain 10. The first and second drive systems generate torque to drive one or more sets of vehicle drive wheels 28 of the electrified vehicle 12.

The engine 14, which in an embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28. In one embodiment, the power transfer units 30, 44 are part of a transaxle 20 of the electrified vehicle 12.

The motor 22 can also be employed to drive the vehicle drive wheels 28 by outputting torque to a shaft 55 that is also connected to the second power transfer unit 44. In one embodiment, the motor 22 is part of a regenerative braking system. For example, the motor 22 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18, and/or other electrical loads of the electrified vehicle 12. Other types of energy storage devices and/or output devices can also be used to electrically power the electrified vehicle 12.

The electrified vehicle 12 may employ two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

The electrified vehicle 12 is also equipped with a charging system 16 for charging the energy storage devices (e.g., battery cells) of the battery pack 24. The charging system 16 may include charging components that are located both onboard the electrified vehicle 12 and external to the electrified vehicle 12. The charging system 16 is connectable to one or more external power sources 26 (e.g., utility/grid power from an electrical grid) for receiving and distributing power throughout the electrified vehicle 12.

In an embodiment, the charging system 16 includes a vehicle inlet assembly 35 (sometimes referred to as a charge port assembly) located on-board the electrified vehicle 12, and an electric vehicle supply equipment (EVSE) assembly 52 that can be operably connected between the vehicle inlet assembly 35 and the external power source 26. The vehicle inlet assembly 35 may include one or more ports adapted to receive a connector (sometimes referred to as a coupler) of the EVSE assembly 52. The vehicle inlet assembly 35 is therefore configured to receive power from the external power source 26 and then supply the power to the battery pack 24 for charging the battery cells contained therein.

The charging system 16 may be equipped with power electronics for converting AC power received from the external power source 26 to DC power for charging the energy storage devices of the battery pack 24. The charging system 16 is also configured to accommodate one or more conventional voltage sources from the external power source 26 (e.g., 110 volt, 220 volt, etc.). The charging system 16 may be configured to provide any level of charging (e.g., level 1, 2, DC, etc.).

The powertrain 10 of FIG. 1 is highly schematic and is not intended to limit this disclosure. Various additional components could alternatively or additionally be employed by the powertrain 10 within the scope of this disclosure.

Figure 2:
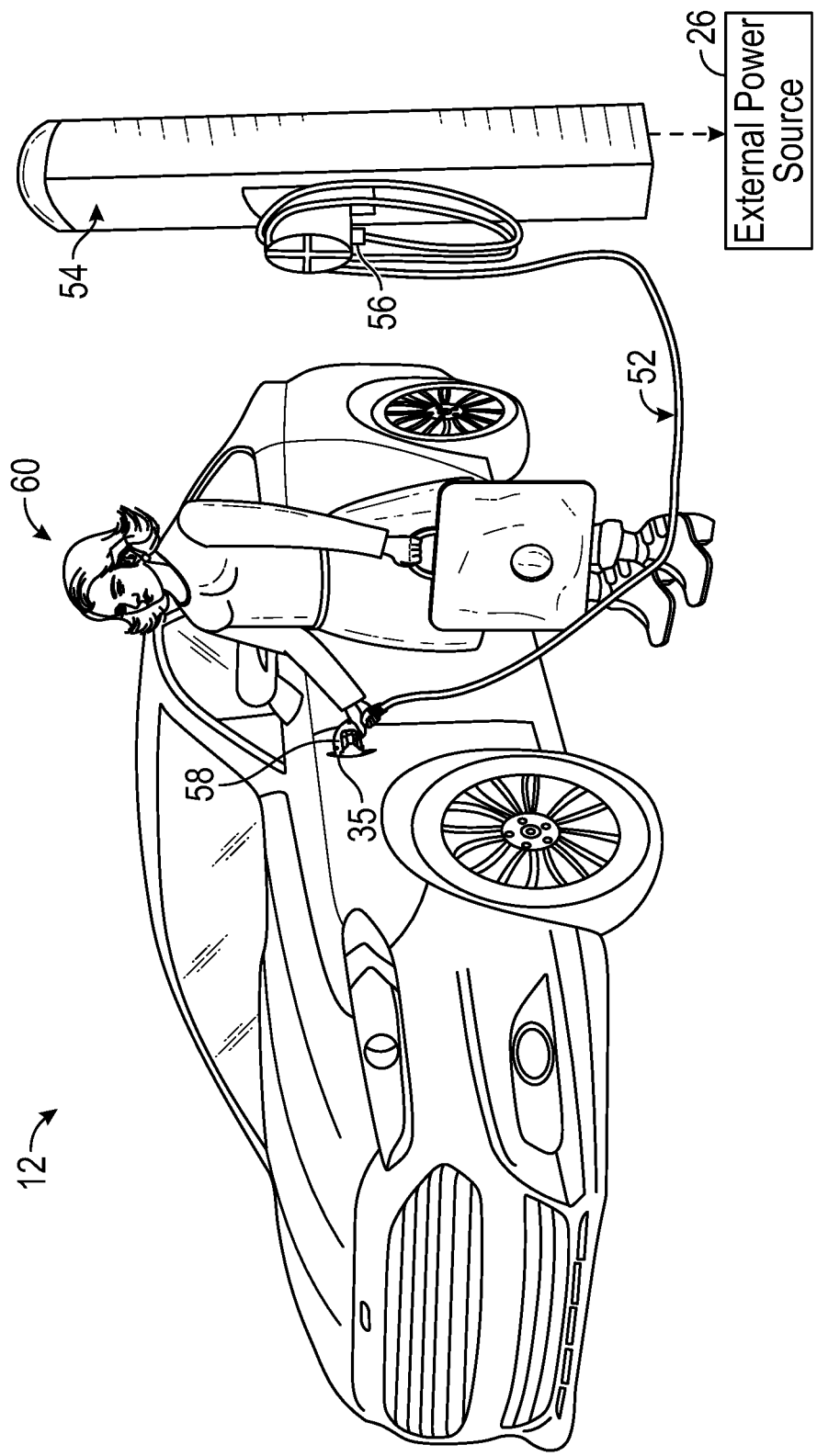
FIG. 2 schematically illustrates an electrified vehicle while being charged at a charging station.

FIG. 2 schematically illustrates an electrified vehicle 12 parked near a charging station 54 for charging. The electrified vehicle 12 may employ the powertrain 10 of FIG. 1, or any other electrified powertrain in which electric drive components are configured to electrically propel the wheels of the electrified vehicle 12, either with or without the assistance of an engine.

The charging station 54 is powered by the external power source 26. In an embodiment, the external power source 26 includes utility grid power. In another embodiment, the external power source 26 includes an alternative energy source, such as solar power, wind power, etc. In yet another embodiment, the external power source 26 includes a combination of utility grid power and alternative energy sources.

The EVSE assembly 52 (or a connected cord set of the charging station 54) may be connected to both the charging station 54 (or a wall outlet) and the vehicle inlet assembly 35 for charging the electrified vehicle 12. For example, the EVSE assembly 52 may include a plug 56 for connecting to the charging station 54 (or a wall outlet) and a connector 58 (sometimes referred to as a coupler) for connecting to the vehicle inlet assembly 35 of the electrified vehicle 12. Power originating from the external power source 26 may be transferred from the charging station 54 to the vehicle inlet assembly 35 for charging the battery pack 24 of the electrified vehicle 12 via the connector 58. The power received by the vehicle inlet assembly 35 may be transferred to an on-board charger module and then over high voltage cables to the battery pack 24 for replenishing the energy of the battery cells housed within the battery pack 24.

In most electrified vehicles, a user 60 is limited to a single charging input (i.e., conventional charging through the EVSE assembly 52) for charging the battery pack 24. However, the user 60 may desire to select between multiple different charging inputs, such as when the charging station 54 offers conductive charging or wireless charging, for example. This disclosure therefore proposes charging systems equipped with charging input selector systems for allowing the user 60 to passively select between two or more charging input power sources when charging the electrified vehicle 12.

Figure 3:
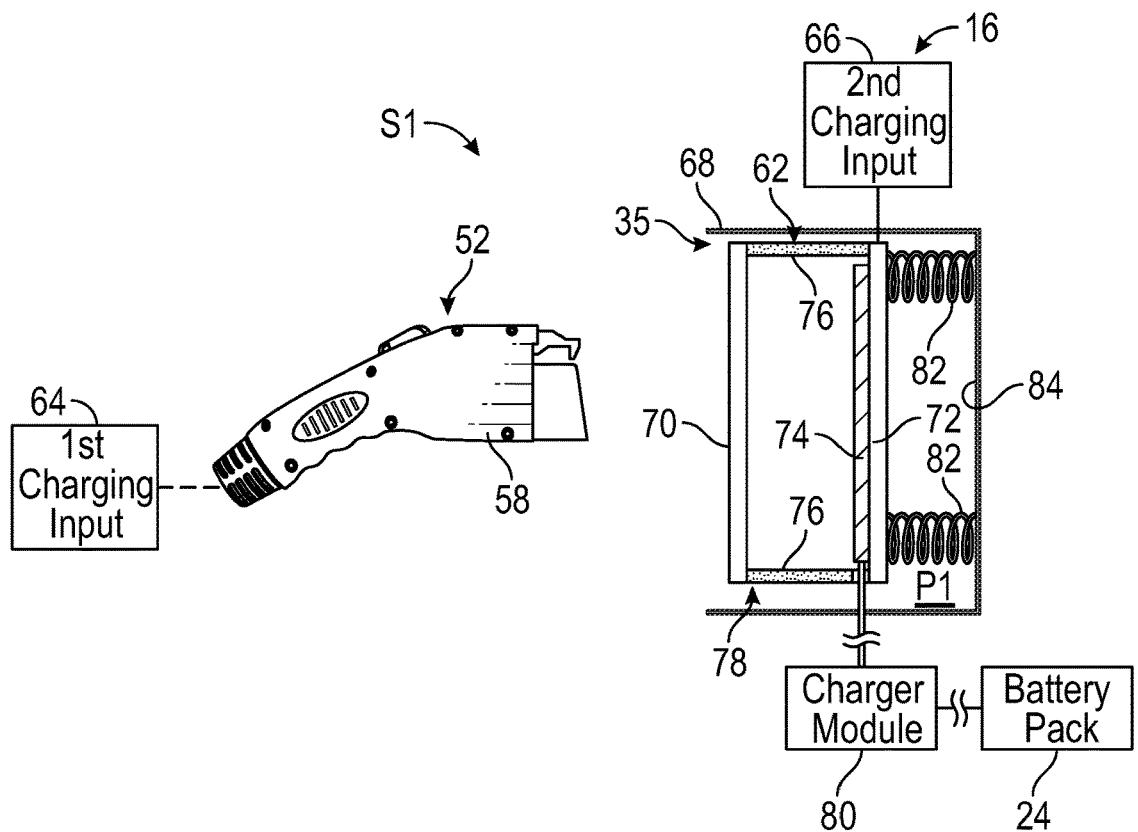
FIG. 3 is a schematic side view of a charging input selector system associated with a vehicle inlet assembly of an electrified vehicle charging system. The charging input selector system is depicted in a first state in FIG. 3.
Figure 4:
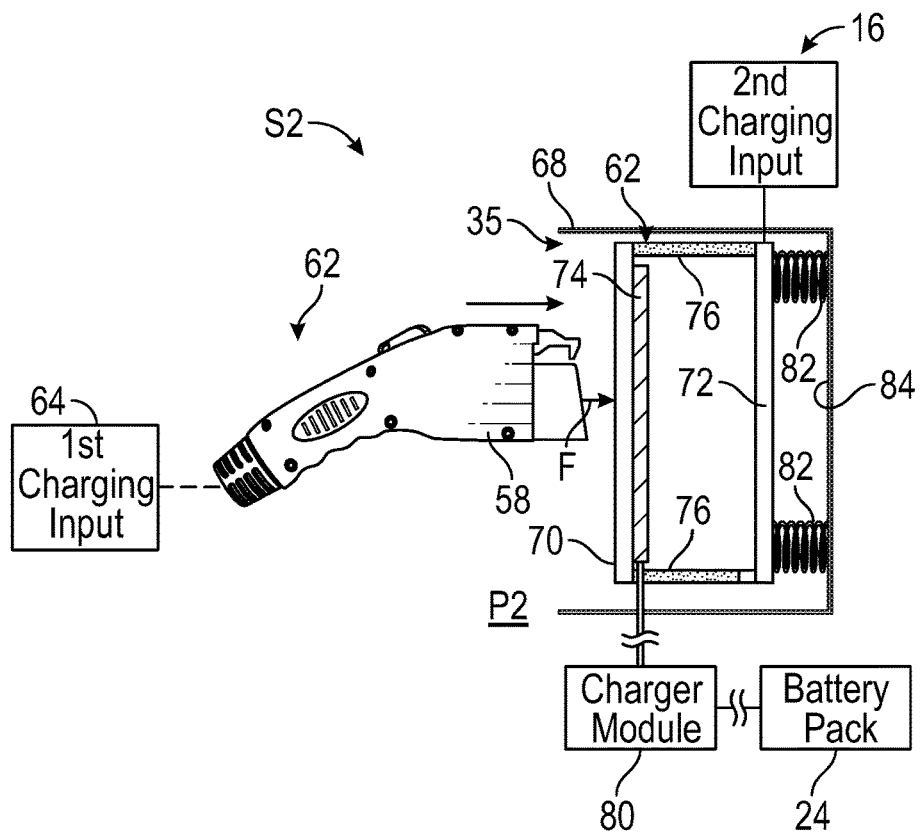
FIG. 4 is another schematic side view of the charging input selector system of FIG. 3. The charging input selector system is depicted in a second state in FIG. 4.

FIGS. 3 and 4, with continued reference to FIGS. 1-2, illustrate an exemplary charging input selector system 62 of the charging system 16 of the electrified vehicle 12. The charging input selector system 62 is configured to allow the vehicle user to select between a first charging input 64 and a second charging input 66 when charging the electrified vehicle 12. In an embodiment, the first charging input 64 is provided through the EVSE assembly 52, and the second charging input 66 is provided by a hands-free conductive charger or a wireless inductive charger, for example. However, other charging inputs, including via a DC fast charger, are further contemplated within the scope of this disclosure, and the charging input selector system 62 is configured to allow for selection between two or more available charging inputs.

The charging input selector system 62 may be supported within a housing 68 of the vehicle inlet assembly 35 and may include a first selector unit 70 associated with the first charging input 64, a second selector unit 72 associated with the second charging input 66, and an on-board charger unit 74. The first selector unit 70 and the second selector unit 72 may be connected together by one or more spacer rods 76 to establish a movable assembly 78. The first and second selector units 70, 72 are therefore spaced apart and cannot contact one another. The movable assembly 78 may be moved between a first position P1 (see FIG. 3) and a second position P2 (see FIG. 4) to position either the first selector unit 70 or the second selector unit 72 into contact with the on-board selector unit 74. As illustrated, the second selector unit 72 contacts the on-board charger unit 74 when the movable assembly 78 is in the first position P1, and the first selector unit 70 contacts the on-board charger unit 74 when the movable assembly 78 is moved to the second position P2.

In an embodiment, the first selector unit 70, the second selector unit 72, and the on-board charger unit 74 are each disk-shaped units. However, other shapes, including but not limited to bar-shaped units, are also contemplated within the scope of this disclosure.

The on-board charger unit 74 is stationary and is electrically connected to an on-board charger module 80 of the charging system 16. The on-board charger module 80 is equipped with the necessary power electronics for converting AC power received from either the first charging input 64 or the second charging input 66 to DC power for charging the energy storage devices of the battery pack 24. The on-board charger module 80 may further be equipped to perform various inverting and rectifying operations.

The on-board charger module 80 receives power from the first charging input 64 for charging the battery pack 24 when the first selector unit 70 is moved into contact with the on-board charger unit 74, and the on-board charger module 80 receives power from the second charging input 66 for charging the battery pack 24 when the second selector unit 72 is moved into contact with the on-board charger unit 74. The first selector unit 70 becomes inactive and therefore unable to transfer power to the on-board charger module 80 when the second selector unit 72 is moved into contact with the on-board charger unit 74, and the second selector unit 72 becomes inactive and therefore unable to transfer power to the on-board charger module 80 when the first selector unit 70 is moved into contact with the on-board charger unit 74. Thus, only one of the first selector unit 70 and the second selector unit 72 may be positioned in contact with the on-board charger unit 74 at any given time.

A first state S1 of the charging input selector system 62 is depicted in FIG. 3. In the first state S1, the movable assembly 78 is in the first position P1 such that the second selector unit 72 contacts the on-board charger unit 74 and power from the second charging input 66 can be provided to the on-board charger module 80 for charging the battery pack 24.

In an embodiment, the first state S1 is the default position of the charging input selector system 62. The second selector unit 72 may be biased against the on-board charger unit 74 in the default position by one or more springs 82. The springs 82 may be affixed relative to an internal surface 84 of the housing 68 for applying a biasing force to force the second selector unit 72 into contact with the on-board charger unit 74.

A second state S2 of the charging input selector system 62 is depicted in FIG. 4. The first selector unit 70 may be pushed in a direction toward the on-board charger unit 74 to transition the charging input selector system 62 from the first state S1 to the second state S2. In the second state S2, the movable assembly 78 is in the second position P2 such that the first selector unit 70 contacts the on-board charger unit 74 and power from the first charging input 64 can be provided to the on-board charger module 80 for charging the battery pack 24.

In an embodiment, an insertion force F (see FIG. 4) associated with inserting the connector 58 of the EVSE assembly 52 into the vehicle inlet assembly 35 is large enough to overcome the biasing force of the springs 82 and thereby move the first selector unit 70 into contact with the on-board charger unit 74 and displace the second selector unit 72 out of contact with the on-board charger unit 74. The charging input selector system 62 is therefore considered a passive selector system. No relays or actuators are required for switching between the available first and second charging inputs 64, 66.

Although the first state S1 is described above as being the default position, it should be recognized that an opposite configuration is alternatively possible in which the second state S2 is the default position of the charging input selector system 62.

Figure 5:
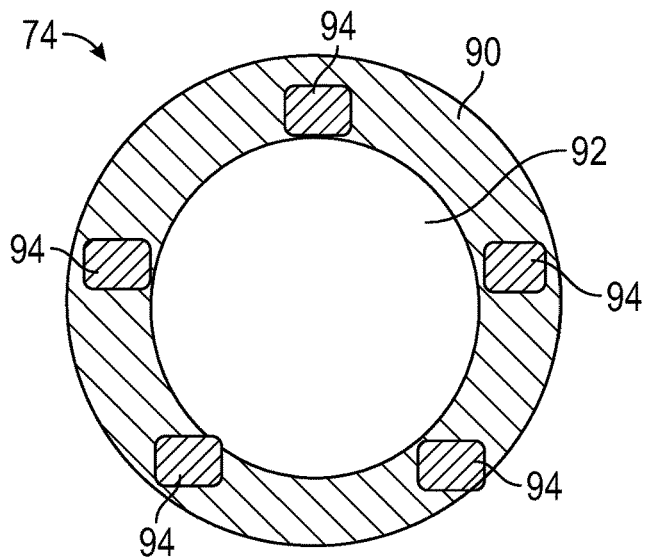
FIG. 5 illustrates an exemplary selector unit of the charging input selector system of FIGS. 3-4.

FIG. 5 illustrates an exemplary design of the on-board charger unit 74 of the charging input selector system 62. Although the on-board charger unit 74 is depicted, the first selector unit 70 and the second selector unit 72 could include a design similar to the on-board charger unit 74 of FIG. 5.

The exemplary on-board charger unit 74 may include a body 90 with a hole 92 formed through the body 90. The body 90 may be disk-shaped, bar-shaped, etc. Electrical contacts 94, such as copper conductive contacts, may be mounted at one or both sides of the body 90. In the illustrated embodiment, five electrical contacts 94 are provided, such as for single-phase AC charging input applications. However, the on-board charger unit 74 could include one or more electrical contacts depending on the configuration of the respective charging input.

Figure 6:
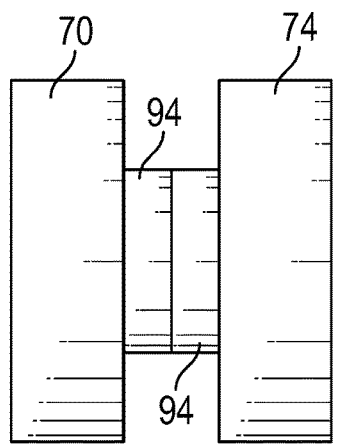
FIGS. 6 and 7 schematically illustrate electrical contacts of pairs of selector units of a charging input selector system.

FIG. 6 illustrates portions of the first selector unit 70 in contact with the on-board charger unit 74. When the first selector unit 70 is moved into contact with the on-board charger unit 74, the electrical contacts 94 of the first selector unit 70 directly contact the corresponding electrical contacts 94 of the on-board charger unit 74.

Figure 7:
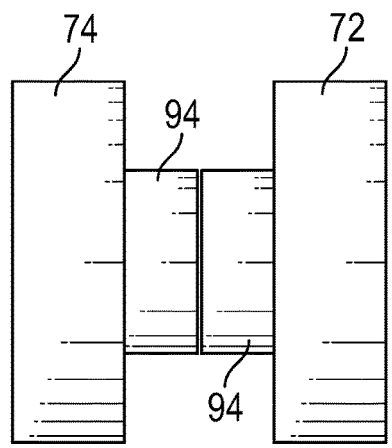

FIG. 7 illustrates portions of the second selector unit 72 in contact with the on-board charger unit 74. When the second selector unit 72 is moved into contact with the on-board charger unit 74, the electrical contacts 94 of the second selector unit 72 directly contact the corresponding electrical contacts 94 of the on-board charger unit 74.

The charging systems of this disclosure include charging input selector systems that allow for passively selecting between two or more available charging inputs for charging the vehicle battery. The exemplary charging input selector systems enable hands-free and/or wireless charging solutions to be accommodated within electrified vehicles in addition to the traditional charging solutions provided by EVSE assemblies.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A charging system for an electrified vehicle, comprising:
   a vehicle inlet assembly;
   a charging input selector system housed within the vehicle inlet assembly and including a first selector unit movable between a first position that is displaced from an on-board charger unit and a second position that is in contact with the on-board charger unit; and
   an on-board charger module electrically connected to the on-board charger unit,
   wherein the charging input selector system is supported within a housing of the vehicle inlet assembly, and the vehicle inlet assembly further includes one or more ports adapted to receive a connector of an electric vehicle supply equipment (EVSE) assembly,
   wherein the charging input selector system is adapted such that an insertion force of the connector moves the first selector unit from the first position to the second position.

2. The charging system as recited in claim 1, comprising a battery pack configured to receive power from the on-board charger module.

3. A charging system for an electrified vehicle, comprising:
   a vehicle inlet assembly;
   a charging input selector system housed within the vehicle inlet assembly and including a first selector unit movable between a first position that is displaced from an on-board charger unit and a second position that is in contact with the on-board charger unit; and an on-board charger module electrically connected to the on-board charger unit, wherein the charging input selector system includes a second selector unit that is movable between a first position that contacts the on-board charger unit and a second position that is displaced from the on-board charger unit.

4. The charging system as recited in claim 3, wherein a first charging input supplies power to the on-board charger module when the first selector unit is in contact with the on-board charger unit and a second charging input supplies power to the on-board charger module when the second selector unit is in contact with the on-board charger unit.

5. The charging system as recited in claim 4, wherein the first charging input is provided by a connector of an electric vehicle supply equipment (EVSE) assembly and the second charging input is provided by a hands-free conductive charger or a wireless inductive charger.

6. The charging system as recited in claim 3, wherein the second selector unit is biased toward the first position by a spring.

7. The charging system as recited in claim 6, wherein the spring extends between the second selector unit and an internal surface of a housing of the vehicle inlet assembly.

8. The charging system as recited in claim 1, wherein, in the second position, an electrical contact of the first selector unit is in direct contact with a corresponding electrical contact of the on-board charger unit.

9. The charging system as recited in claim 1, wherein the first selector unit and the on-board charger unit each include a disk-shaped body and a plurality of electrical contacts mounted to the disk-shaped body.

10. The charging system as recited in claim 1, wherein the charging input selector system includes a second selector unit that is connected to the first selector unit by a spacer rod to establish a movable assembly.

11. The charging system as recited in claim 10, wherein the movable assembly is movable to position the first selector unit in either the first position or the second position.

12. The charging system as recited in claim 11, wherein the movable assembly is configured to position the first selector unit in the second position when the connector of the electric vehicle supply equipment (EVSE) assembly is inserted into the vehicle inlet assembly.

13. A method, comprising:

during an insertion of a connector of an electric vehicle supply equipment (EVSE) assembly into a vehicle inlet assembly of a charging system of an electrified vehicle, automatically switching between a first charging input and a second charging input associated with an on-board charger module of the charging system, wherein an insertion force of the connector during the insertion causes the charging system to switch from the second charging input to the first charging input.

14. The method as recited in claim 13, wherein automatically switching between the first charging input and the second charging input includes:

moving a first selector unit of a charging input selector system from a first position that is displaced from an on-board charger unit and a second position that is in contact with the on-board charger unit, wherein the on-board charger unit is electrically connected to the on-board charger module.

15. The method as recited in claim 14, comprising:

biasing a second selector unit of the charging input selector system into contact with the on-board charger unit when the connector of the EVSE assembly is removed from the vehicle inlet assembly.

16. The method as recited in claim 14, wherein the first charging input is provided by the EVSE assembly when the first selector unit is in the second position and the second charging input is provided by an alternative power source when the first selector unit is in the first position, and further wherein the alternative power source is a hands-free conductive charger or a wireless inductive charger.

17. The method as recited in claim 13, comprising:

charging an energy source of a battery pack of the electrified vehicle with power received from the charging input.

18. The method as recited in claim 14, wherein the charging input selector system is a passive selector system that does not require relays or actuators for switching between the first charging input and the second charging input.

* * * * *